J. CAIRNS.
TIRE FOR WHEELS OF VEHICLES.
APPLICATION FILED JULY 29, 1908.

948,389.

Patented Feb. 8, 1910.

Witnesses
Geo. C. Davison
Maurice Goldberger

Inventor
John Cairns
By J. Singer
Atty.

UNITED STATES PATENT OFFICE.

JOHN CAIRNS, OF WILLENHALL, SOUTH STAFFS, ENGLAND.

TIRE FOR WHEELS OF VEHICLES.

948,389.

Specification of Letters Patent.

Patented Feb. 8, 1910.

Application filed July 29, 1908. Serial No. 446,005.

*To all whom it may concern:*

Be it known that I, JOHN CAIRNS, late of Birmingham street, now of Walsall Road, Willenhall, South Staffs, England, mechanic, have invented certain new and useful Improvements in and Connected with the Tires of Wheels of Vehicles, of which the following is a specification.

This invention relates to that class of tires wherein the tread portion is formed by a plurality of yielding studs.

The invention has for its object the provision of an improved form of stud and also an improved form of mounting therefor.

The invention will be more fully described in connection with the accompanying drawings and will be more particularly pointed out and ascertained in and by the appended claim.

Figure 1:
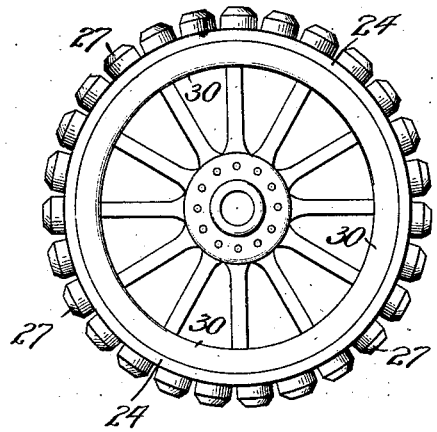
Figure 2:
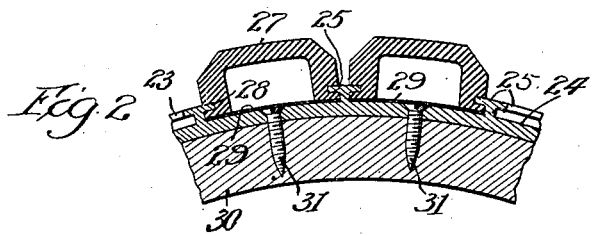
Figure 3:
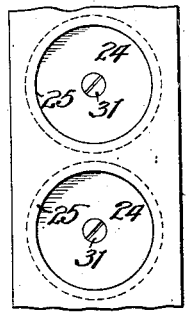

In the drawing:—Figure 1 is a view in side elevation of a wheel provided with studs according to my invention and adapted for use in connection with heavy trucks and vehicles of like character. Fig. 2 is a longitudinal sectional view showing the manner in which the studs are secured in place. Fig. 3 is a plan view with the studs omitted.

Like numerals of reference designate similar parts throughout the different figures of the drawings.

Referring to the form shown, the stud holder comprises an annular member 23 provided with a plurality of recesses 24 of circular formation. Each recess 24 is provided with an inwardly projecting flange 25, forming with the bottom of said holders an annular space or cavity. The studs 27 are of hollow construction and are provided with recesses 28 which permit them to be inserted and withdrawn from the flanges 25. In order to form a more effective air cushion a strip of canvas or other suitable material 29 is placed in the bottom of each cavity and is firmly engaged by the base of each stud when the same is in position. Conveniently the annular member 23 is attached to the felly 30 of the vehicle wheel by suitable devices such as screws 31.

I claim:—

A vehicle wheel tire structure comprising in combination, a plurality of hollow studs of yielding material each provided with an annular groove near its base, a plurality of circular portions receiving the studs and having flanges engaging the grooves to secure the studs and confine the air therein, and pieces of canvas interposed between the bases of said studs and said circular portions, substantially as and for the purpose set forth.

In testimony whereof I affix my signature in presence of two witnesses.

JOHN CAIRNS.

Witnesses:
JOHN LIDDLE,
JOHN TRAIN LIDDLE.